United States Patent
Jiang et al.

(10) Patent No.: US 12,082,203 B2
(45) Date of Patent: Sep. 3, 2024

(54) CHANNEL MONITORING INDICATION METHOD, TERMINAL, AND NETWORK DEVICE

(71) Applicant: VIVO MOBILE COMMUNICATION CO., LTD., Dongguan (CN)

(72) Inventors: Dajie Jiang, Dongguan (CN); Zichao Ji, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 780 days.

(21) Appl. No.: 17/133,543

(22) Filed: Dec. 23, 2020

(65) Prior Publication Data
US 2021/0120577 A1   Apr. 22, 2021

Related U.S. Application Data

(63) Continuation of application No. PCT/CN2019/095364, filed on Jul. 10, 2019.

(30) Foreign Application Priority Data

Jul. 13, 2018 (CN) .......................... 201810770418.9

(51) Int. Cl.
*H04L 5/00* (2006.01)
*H04W 24/08* (2009.01)
*H04W 72/23* (2023.01)

(52) U.S. Cl.
CPC .................................. *H04W 72/23* (2023.01)

(58) Field of Classification Search
CPC .... H04W 72/23; H04W 24/08; H04B 17/309; H04L 5/0053
See application file for complete search history.

(56) References Cited

U.S. PATENT DOCUMENTS

2018/0220485 A1* 8/2018 Su .......................... H04W 76/27
2018/0227856 A1* 8/2018 Yang ................. H04W 52/0274
(Continued)

FOREIGN PATENT DOCUMENTS

CN   101404526 A   4/2009
CN   101883369 A   11/2010
(Continued)

OTHER PUBLICATIONS

3GPP TSG RAN WG1 Meeting#95, R1-1812891 Title: Discussion on CSI report enhancement for CDRX (Year: 2018).*
(Continued)

*Primary Examiner* — Faruk Hamza
*Assistant Examiner* — Abusayeed M Haque
(74) *Attorney, Agent, or Firm* — PX PLLC

(57) ABSTRACT

Embodiments of the present disclosure provide a channel monitoring indication method. The exemplary method includes monitoring a first physical downlink control channel (PDCCH). The method further includes determining, according to the scheduling downlink control information (DCI), whether to monitor a second PDCCH if scheduling DCI is received from the first PDCCH. The method also includes monitoring the second PDCCH according to received target signaling if the scheduling DCI is not received from the first PDCCH. The target signaling is different from the scheduling DCI. The target signaling is further used to indicate a monitoring parameter associated with the second PDCCH. The method additionally includes monitoring the second PDCCH after the first transmission time according to the received target signaling.

20 Claims, 7 Drawing Sheets

Send a first physical downlink control channel PDCCH, where the first PDCCH carries scheduling downlink control information DCI, and the scheduling DCI is used to indicate to a terminal whether to monitor a second PDCCH — S1

(56) References Cited

U.S. PATENT DOCUMENTS

| | | | | |
|---|---|---|---|---|
| 2018/0270756 A1* | 9/2018 | Bhattad | ............... | H04W 72/541 |
| 2018/0279374 A1* | 9/2018 | Sun | ....................... | H04L 5/0051 |
| 2018/0302864 A1* | 10/2018 | Nigam | ................ | H04W 52/325 |
| 2019/0021051 A1* | 1/2019 | Joseph | .................. | H04W 48/20 |

FOREIGN PATENT DOCUMENTS

| | | | | |
|---|---|---|---|---|
| CN | 104301273 A | 1/2015 | | |
| CN | 107306174 A | 10/2017 | | |
| CN | 107666713 A | 2/2018 | | |
| CN | 108023714 A | 5/2018 | | |
| CN | 108270514 A | 7/2018 | | |
| CN | 108632960 A | 10/2018 | | |
| EP | 3331179 A1 | 6/2018 | | |
| WO | WO-2014166060 A1 * | 10/2014 | ........ | H04W 72/0446 |
| WO | 2018127241 A1 | 7/2018 | | |
| WO | WO-2018175760 A1 * | 9/2018 | ........ | H04W 52/0216 |

OTHER PUBLICATIONS

3GPP TSG-RAN2 Meetng#106, R2-1906616 Title: UE assistance information for CDRX (Year: 2019).*

First Office Action issued in related Chinese Application No. 201810770418.9, mailed Oct. 28, 2020, 9 pages.

Huawei et al, "Designs for UE power saving", 3GPP TSG RAN WG1 Meeting #91 R1-1719832, Dec. 1, 2017 (Dec. 1, 2017), section 2.2.

International Search Report issued in corresponding International Application No. PCT/CN2019/095364, mailed Sep. 29, 2019, 4 pages.

ZTE et al, "Search space design and related issues", 3GPP TSG RAN WG1 Meeting #92Bis R1-1803791,Apr. 20, 2018(Apr. 20, 2018), section 2.

Search Report issued in related Chinese Application No. 201810770418.9, mailed Jul. 7, 2020, 5 pages.

* cited by examiner

Send a first physical downlink control channel PDCCH, where the first PDCCH carries scheduling downlink control information DCI, and the scheduling DCI is used to indicate to a terminal whether to monitor a second PDCCH ⟵ S1

FIG. 5

CHANNEL MONITORING INDICATION METHOD, TERMINAL, AND NETWORK DEVICE

CROSS REFERENCE TO RELATED APPLICATIONS

This application is a bypass continuation of PCT Application No. PCT/CN2019/095364 filed Jul. 10, 2019, which claims priority to Chinese Patent Application No. 201810770418.9 filed on Jul. 13, 2018 in China, both of which are incorporated herein by reference in their entireties.

TECHNICAL FIELD

The present disclosure relates to the field of communications technologies, and in particular, to a channel monitoring indication method, a terminal, and a network device.

BACKGROUND

In a mobile communications system, a network device notifies a terminal of all of a monitoring period, an offset (offset), and a duration (duration) of a Physical Downlink Control Channel (PDCCH) by using Radio Resource Control (RRC) signaling. However, a PDCCH monitoring period configured by the network device may be improper. For example, if a service package arrives in a period of 20 ms, but the PDCCH monitoring period configured by the network device is 2 ms, the terminal frequently performs blind PDCCH monitoring, but detects no grant information (including an uplink grant and a downlink grant). As a result, the terminal performs blind PDCCH monitoring according to the improper configuration, which does not help the terminal save electricity.

SUMMARY

Embodiments of the present disclosure provide a channel monitoring indication method, a terminal, and a network device, to resolve the electricity consumption problem caused by improper PDCCH monitoring by a terminal.

According to a first aspect, an embodiment of the present disclosure provides a channel monitoring indication method, applied to a terminal side, and including:
  monitoring a first PDCCH; and
  if scheduling downlink control information (DCI) is received from the first PDCCH, determining, according to the scheduling DCI, whether to monitor a second PDCCH.

According to a second aspect, an embodiment of the present disclosure further provides a terminal, including:
  a first monitoring module, configured to monitor a first physical downlink control channel PDCCH; and
  a second monitoring module, configured to: if scheduling DCI is received from the first PDCCH, determine, according to the scheduling DCI, whether to monitor a second PDCCH.

According to a third aspect, an embodiment of the present disclosure provides a terminal. The terminal includes a processor, a memory, and a computer program stored in the memory and running on the processor. When the computer program is executed by the processor, the steps of the channel monitoring indication method are performed.

According to a fourth aspect, an embodiment of the present disclosure provides a channel monitoring indication method, applied to a network device side, and including:
  sending a first PDCCH, where the first PDCCH carries scheduling DCI, and the scheduling DCI is used to indicate to a terminal whether to monitor a second PDCCH.

According to a fifth aspect, an embodiment of the present disclosure provides a network device, including:
  a first sending module, configured to send a first PDCCH, where the first PDCCH carries scheduling DCI, and the scheduling DCI is used to indicate to a terminal whether to monitor a second PDCCH.

According to a sixth aspect, an embodiment of the present disclosure further provides a network device. The network device includes a processor, a memory, and a computer program stored in the memory and running on the processor. When the processor executes the computer program, the steps of the channel monitoring indication method are performed.

According to a seventh aspect, an embodiment of the present disclosure provides a computer-readable storage medium. The computer-readable storage medium stores a computer program. When the computer program is executed by a processor, the steps of the channel monitoring indication method are performed.

In this way, in the foregoing technical solutions of the embodiments of the present disclosure, the scheduling DCI is used to dynamically indicate whether to monitor the PDCCH, so that the terminal monitors the PDCCH more flexibly. This can avoid unnecessary PDCCH monitoring and help the terminal save electricity.

BRIEF DESCRIPTION OF DRAWINGS

To describe the technical solutions in the embodiments of the present disclosure more clearly, the following briefly describes the accompanying drawings required in descriptions of the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

FIG. 5 is a schematic flowchart of a channel monitoring indication method applied to a network device side according to an embodiment of the present disclosure;

DETAILED DESCRIPTION

Figure 1:
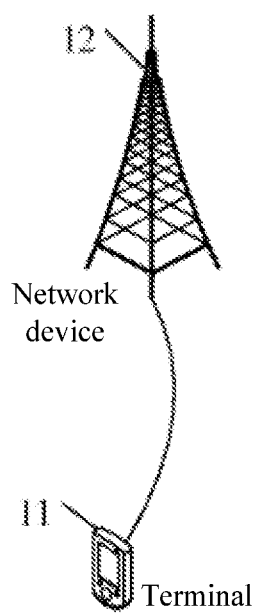
FIG. 1 is a block diagram of a mobile communications system to which an embodiment of the present disclosure can be applied.

Exemplary embodiments of the present disclosure are described below in further detail with reference to the accompanying drawings. Although the accompanying drawings show exemplary embodiments of the present disclosure, it should be understood that the present disclosure can be implemented in various forms and shall not be limited by embodiments described herein. Instead, these embodiments are provided to help more thoroughly understand the present disclosure and entirely convey the scope of the present disclosure to a person skilled in the art.

Terms such as "first" and "second" in the specification and claims of this application are used to distinguish similar objects, instead of describing a specific sequence or order. It should be understood that data used in such a way can be exchanged in proper situations, so that the embodiments of the present disclosure described herein can be implemented in sequences other than those illustrated or depicted herein. In addition, the terms "comprise", "include", and any variants thereof are intended to cover non-exclusive inclusion. For example, a process, a method, a system, a product, or a device that includes a series of steps or units is not necessarily limited to those steps or units listed expressly, but instead may include other steps or units not expressly listed or inherent to the process, the method, the product, or the device. "And/or" used in the specification and claims means at least one of the connected objects.

The technology described herein is not limited to a Long Time Evolution (LTE)/LIE-Advanced (LTE-A) system, and can also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA) systems, and other systems. The terms "system" and "network" are often used interchangeably. The technology described herein can be used in the above-mentioned systems and radio technologies as well as other systems and radio technologies. However, a New Radio (NR) system is described in the following description for the illustrative purpose, and NR terminologies are used in most of the following descriptions, though these technologies can also be applied to applications other than the NR system application.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described methods can be performed in an order different from that described, and various steps can be added, omitted, or combined. In addition, features described with reference to some examples may be combined in other examples.

Referring to FIG. 1, FIG. 1 is a block diagram of a wireless communications system to which an embodiment of the present disclosure can be applied. The wireless communications system includes a terminal 11 and a network device 12. The terminal 11 may also be referred to as a terminal device or a User Equipment (UE). The terminal 11 may be a terminal-side device such as a mobile phone, a Tablet Personal Computer, a Laptop Computer, a Personal Digital Assistant (PDA), a Mobile Internet Device (MID), a Wearable Device, or a vehicle-mounted device. It should be noted that a specific type of the terminal 11 is not limited in the embodiments of the present disclosure. The network device 12 may be a base station or a core network. The base station may be a base station of 5G and later releases (for example, a gNB and a 5G NR NB), or a base station in other communications systems (for example, an eNB, a Wireless Local Area Network (WLAN) access point, or other access points). The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wireless Fidelity (WiFi) node, or another appropriate term in the art. Provided that the same technical effects are achieved, the base station is not limited to a specific technical vocabulary. It should be noted that in the embodiments of the present disclosure, only the base station in the NR system is used as an example, but a specific type of the base station is not limited.

The base station can communicate with the terminal 11 under the control of a base station controller. In various examples, the base station controller may be a part of the core network or some base stations. Some base stations can exchange control information or user data with the core network through backhaul. In some examples, some of these base stations can directly or indirectly communicate with each other over a backhaul link, which may be a wired or wireless communication link. The wireless communications system can support operations on a plurality of carriers (waveform signals of different frequencies). A multi-carrier transmitter can simultaneously transmit modulated signals on the plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 11 via one or more access point antennas. Each base station can provide communication coverage for each corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

The communication link in the wireless communications system may include an uplink for carrying Uplink (UL) transmission (for example, from the terminal 11 to the network device 12), or a downlink for carrying Downlink (DL) transmission (for example, from the network device 12 to the terminal 11). The UL transmission may also be referred to as reverse link transmission, and the DL transmission may also be referred to as forward link transmission.

Figure 2:
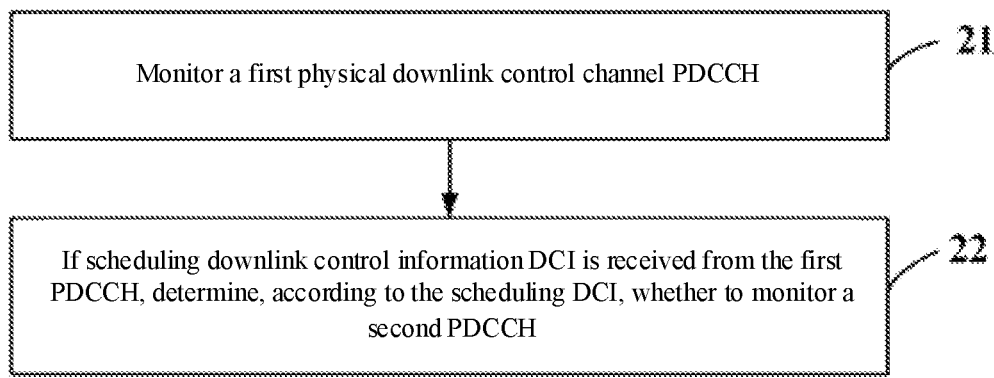
FIG. 2 is a schematic flowchart of a channel monitoring indication method applied to a terminal side according to an embodiment of the present disclosure.

As shown in FIG. 2, an embodiment of the present disclosure provides a channel monitoring indication method, applied to a terminal side. The method includes the following steps:

Step 21: Monitor a first physical downlink control channel PDCCH.

A monitoring parameter of the first PDCCH is configured by a network device, where the monitoring parameter includes: at least one of a monitoring period, a monitoring offset, and a monitoring duration.

Step 22: If scheduling DCI is received from the first PDCCH, determine, according to the scheduling DCI, whether to monitor a second PDCCH.

The scheduling (Scheduling) DCI may indicate to the terminal whether to monitor the second PDCCH. In this way, the scheduling DCI is used to dynamically indicate a monitoring behavior of the terminal. This can avoid unnecessary PDCCH monitoring of the terminal and save electricity of the terminal.

It should be noted that a monitoring behavior of the first PDCCH may be determined in a manner that is the same as or different from that of determining the monitoring behavior of the second PDCCH. For example, the monitoring behavior of the first PDCCH may be determined according to scheduling DCI of a previous PDCCH, or the monitoring behavior of the first PDCCH is determined according to target signaling (for example, RRC signaling).

Further, after step 21, the method further includes: if the scheduling DCI is not received from the first PDCCH, monitoring the second PDCCH according to received target signaling, where the target signaling is different from the scheduling DCI, and the target signaling is used to indicate a monitoring parameter associated with the second PDCCH. The monitoring parameter associated with the second PDCCH includes: at least one of a monitoring period, a monitoring offset (offset), and a monitoring duration (duration). Herein, the target signaling includes, but is not limited to: a Medium Access Control (MAC) layer Control Element (CE), RRC signaling, and the like. The RRC signaling is used as an example. The terminal monitors the second PDCCH according to a monitoring parameter of a search space (search space) configured by using the RRC signaling.

In the embodiments of the present disclosure, the second PDCCH corresponds to at least one DCI format (format), and/or the second PDCCH corresponds to at least one search space. The DCI format includes, but is not limited to, formats shown in the following Table 1:

TABLE 1

| DCI format (format) | Definition |
|---|---|
| 0_0 | Scheduling of Physical Uplink Shared Channel(PUSCH) in one cell |
| 0_1 | Scheduling of PUSCH in one cell |
| 1_0 | Scheduling of Physical Downlink Shared Channel(PDSCH) in one cell |
| 1_1 | Scheduling of PDSCH in one cell |
| 2_0 | Notifying a group of UEs of the slot format |
| 2_1 | Notifying a group of UEs of the Physical Resource Blocks(PRBs) and Orthogonal Frequency Division Multiplexing (OFDM) symbols where UE may assume that no downlink transmission is intended for the UE |
| 2_2 | Transmission of Transmit Power Control (TPC) commands for Physical Uplink Control Channel(PUCCH) and PUSCH |
| 2_3 | Transmission of a group of TPC commands for Sounding Reference Signal(SRS) transmissions by one or more UEs |

The DCI formats 0_0, 0_1, 1_0, and 1_1 are scheduling DCI, and other DCI formats are non-scheduling DCI.

Further, the system supports, but is not limited to, the following different types of PDCCH search spaces (Search space):

1. Type0-PDCCH common search space. This type of search space is defined for a PDCCH corresponding to Remaining Minimum System Information (RMSI). A DCI format (format) carried in a PDCCH monitored in this type of search space carries a Cyclic Redundancy Check (CRC) scrambled (scrambled) by using a System Information Radio Network Temporary Identity (SI-RNTI) corresponding to a Primary Cell (Pcell).

2. Type0A-PDCCH common search space. This type of search space is defined for a PDCCH corresponding to Other System Information (OSI). A DCI format carried in a PDCCH monitored in this type of search space carries a CRC scrambled by using an SI-RNTI corresponding to a primary cell Pcell.

3. Type1-PDCCH common search space. This type of search space is defined for an ordinary PDCCH (or referred to as a normal PDCCH). A DCI format carried in a PDCCH monitored in this type of search space carries a CRC scrambled by using a Random Access Radio Network Temporary Identity, (RA-RNTI), a Temporary Cell Radio Network Temporary Identity (TC-RNTI), or a Cell Radio Network Temporary Identity (C-RNTI) corresponding to a primary cell Pcell.

4. Type2-PDCCH common search space. A DCI format carried in a PDCCH monitored in this type of search space carries a CRC scrambled by using a Paging Radio Network Temporary Identity (P-RNTI) corresponding to a primary cell Pcell.

5. Type3-PDCCH common search space. A DCI format carried in a PDCCH monitored in this type of search space carries a CRC scrambled by using an Interrupted Transmission Radio Network Temporary Identity (INT-RNTI), a Slot Format Indicator-Radio Network Temporary Identity (SFI-RNTI), a TPC of PUSCH Radio Network Temporary Identity (TPC-PUSCH-RNTI), a TPC of PUCCH Radio Network Temporary Identity (TPC-PUCCH-RNTI), a C-RNTI, a Configured Scheduling-Radio Network Temporary Identity (CS-RNTI), or a Semi-Persistent-Radio Network Temporary Identity (SP-RNTI).

6. Terminal-specific search space (UE-specific search space). A DCI format carried in a PDCCH monitored in this search space carries a CRC scrambled by using a C-RNTI, a CS-RNTI, or an SP-RNTI.

In the embodiments of the present disclosure, the second PDCCH corresponds to at least one of the foregoing search spaces.

In the embodiments of the present disclosure, the scheduling DCI includes an indicator field used to indicate at least one of the following monitoring behaviors:

Monitoring behavior 1: Skip monitoring the second PDCCH within the first transmission time, where the indicator field includes an indicator bit used to instruct the terminal not to monitor the second PDCCH within the first transmission time. The first transmission time is: N time domain transmission units, N monitoring (monitoring) periods of the second PDCCH, or N monitoring time domain transmission units in a monitoring period of the second PDCCH, where the time domain transmission unit includes: a slot, a mini-slot, a millisecond, or a time domain symbol, and N is a positive integer. A slot is used as an example. The scheduling DCI includes an indicator field used to indicate that the second PDCCH is not monitored in subsequent N slots, N PDCCH monitoring periods, or N monitoring slots in a PDCCH monitoring period. In addition, the indicator field may further indicate that the network device does not send the second PDCCH in subsequent N slots, N PDCCH monitoring periods, or N monitoring slots in a PDCCH monitoring period. In this way, the terminal is indirectly instructed not to monitor the second PDCCH either within this duration.

Monitoring behavior 2: Whether to monitor the second PDCCH within the second transmission time, where the indicator field includes an indicator bit used to indicate whether to monitor the second PDCCH within the second transmission time. For example, indicator bits in the indicator field form a bitmap (bitmap). A location of each bit in the bitmap indicates a different time domain transmission unit, a different monitoring (monitoring) period, or a location of a different monitoring time domain transmission unit in a monitoring period. For example, in a 5-bit bitmap, the first bit indicates the first slot within the second transmission time, the second bit indicates the second slot within the second transmission time, and so on. Assuming that the indicator field includes a bitmap formed by N bits, the second transmission time is: N time domain transmission units, N monitoring (monitoring) periods of the second PDCCH, or N monitoring time domain transmission units in a monitoring period of the second PDCCH, where the time domain transmission unit includes: a slot, a mini-slot, a millisecond, or a time domain symbol, and N is a positive integer. When a value of a bit in the bitmap is "1", it indicates that the second PDCCH needs to be monitored on a time domain transmission unit corresponding to the bit; when the value is "0", it indicate that the second PDCCH does not need to be monitored on the time domain transmission unit corresponding to the bit, or vice versa. It should be noted that a value of N corresponding to the first transmission time may be the same as or different from that corresponding to the second transmission time. This is not specifically limited in the embodiments.

Monitoring behavior 3: A monitoring parameter associated with the second PDCCH, where the monitoring parameter associated with the second PDCCH includes: at least one of a monitoring period, a monitoring offset, and a monitoring duration. For example, the indicator field includes two bits. 00 indicates that the monitoring period is 5 slots, 01 indicates that the monitoring period is 10 slots, 10 indicates that the monitoring period is 20 slots, and 11 indicates other purposes.

Further, the indicator field is used to indicate that the monitoring parameter associated with the second PDCCH is one parameter in a monitoring parameter candidate set, where the monitoring parameter candidate set is indicated by the network device by using radio resource control RRC signaling. That is, the network device indicates a monitoring parameter candidate set by using radio resource control RRC signaling, the monitoring parameter candidate set includes at least one monitoring parameter associated with the second PDCCH, and the indicator field is used to indicate one parameter in the monitoring parameter candidate set. For example, optionally, the network device configures a monitoring parameter 1 (for example, the monitoring period is 5 slots), a monitoring parameter 2 (for example, the monitoring period is 10 slots), and a monitoring parameter 3 (for example, the monitoring period is 15 slots) by using RRC signaling. The indicator field of the scheduling DCI is used to indicate a monitoring parameter to be selected, that is, one of the monitoring parameters 1, 2, and 3 to be selected.

Monitoring behavior 4: A Connected Discontinuous Reception (CDRX) parameter, where the CDRX parameter includes: at least one of a CDRX period, a CDRX offset, and a CDRX onDuration period (or referred to as an onduration timer).

Further, similar to the indication manner of the monitoring parameter, the indicator field is used to indicate that the CDRX parameter is one parameter in a CDRX parameter candidate set, where the CDRX parameter candidate set is indicated by the network device by using radio resource control RRC signaling. That is, the network device indicates a CDRX parameter candidate set by using radio resource control RRC signaling, the CDRX parameter candidate set includes at least one CDRX parameter, and the indicator field is used to indicate one parameter in the CDRX parameter candidate set. For example, the network device configures a CDRX parameter 1 (for example, a DRX period is 160 ms), a CDRX parameter 2 (for example, a DRX period is 320 ms), and a CDRX parameter 3 (for example, a DRX period is 1280 ms) by using the RRC signaling. Optionally, the indicator field of the scheduling DCI is used to indicate a CDRX parameter to be selected, that is, one of the CDRX parameters 1, 2, and 3 to be selected.

Monitoring behavior 5: Monitor the second PDCCH according to received target signaling, where the target signaling is different from the scheduling DCI, and the target signaling is used to indicate a monitoring parameter associated with the second PDCCH. Identical to the foregoing target signaling, the target signaling may include, but is not limited to, a MAC layer CE, RRC signaling, and the like. The RRC signaling is used as an example. The terminal monitors the second PDCCH according to a monitoring parameter of a search space (search space) configured by using the RRC signaling.

In the embodiments, the indicator field of the scheduling DCI may include a dedicated indicator field, or the indicator field includes at least one of the following fields: a time domain resource assignment field, a carrier indicator field, a bandwidth part indicator field, and a hybrid automatic repeat request feedback timing indicator field. That is, the dedicated indicator field may be added or some fields in an existing scheduling DCI format may be reused for the scheduling DCI used to indicate a monitoring behavior associated with the second PDCCH. In addition, it should be noted that the indicator field of the scheduling DCI may indicate any one of the monitoring behaviors 1 to 5, or may indicate a combination of the monitoring behaviors 1 to 5 by using different values of different bits in the indicator field.

An example in which the dedicated indicator field is added to the scheduling DCI is used. The network device indicates, by using a new field (for example, four bits) added to DCI, that the terminal does not need to monitor the second PDCCH in subsequent N slots, N monitoring periods of the second PDCCH, or N monitoring slots in a monitoring period of the second PDCCH. The second PDCCH is a PDCCH for transmitting the DCI format 0_0, the DCI format 0_1, the DCI format 1_0, and/or the DCI format 1_1. A 4-bit field may be used to indicate only a value of N and does not indicate other information. Besides, in addition to the value of N, the 4-bit field may further indicate a DCI format of the second PDCCH. For example, one of the 4 bits is used to indicate a DCI format, for example, an uplink or a downlink, and the remaining three bits are used to indicate the value of N. Alternatively, two of the four bits are used to indicate a DCI format, for example, a total of four formats of an uplink or a downlink back-off DCI or an uplink or a downlink non-back-off DCI, and the remaining two bits are used to indicate the value of N.

An example of reusing some fields in a scheduling DCI format is used below to describe an example of indicating the monitoring behavior. Indicating a single monitoring behavior or a combination of monitoring behaviors is similar, and is not described in detail in the embodiments.

In a first example, a time domain resource assignment (Time domain resource assignment) field in the scheduling DCI format is used to indicate that the terminal does not need to monitor the second PDCCH in subsequent N slots, N monitoring periods of the second PDCCH, or N monitoring slots in a monitoring period of the second PDCCH.

1) The first PDCCH is in the DCI format 1_0 or the DCI format 1_1

The network device configures a PDSCH-time domain resource allocation list (PDSCH-Time Domain Resource Allocation List) parameter (in pdsch-Config) of the terminal as having only one entity (entity) by using RRC signaling. The terminal determines time domain scheduling information according to the entity, for example, determines at least one of the following parameters: K0, mappingType, and startSymbolAndLength. In this way, the time domain scheduling information no longer needs to be determined based on the time domain resource assignment field of the scheduling DCI. The network device indicates, by using the time domain resource assignment field (for example, four bits) of the scheduling DCI format, that the terminal does not need to monitor a PDCCH in subsequent N slots or N PDCCH monitoring periods.

It should be noted that the second PDCCH is a PDCCH for transmitting the DCI format 0_0, the DCI format 0_1, the DCI format 1_0, and/or the DCI format 1_1. A 4-bit field may be used to indicate only a value of N and does not indicate other information. Besides, in addition to the value of N, the 4-bit field may further indicate a DCI format of the second PDCCH. For example, one of the four bits is used to indicate a DCI format, for example, an uplink or a downlink, and the remaining three bits are used to indicate the value of N. Alternatively, two of the four bits are used to indicate a DCI format, for example, a total of four formats of an uplink or a downlink back-off DCI or an uplink or a downlink non-back-off DCI, and the remaining two bits are used to indicate the value of N.

2) The first PDCCH is in the DCI format 0_0 or the DCI format 0_1

The network device configures a PUSCH-time domain resource allocation list (PUSCH-Time Domain Resource Allocation List) parameter (in pusch-Config) of the terminal as having only one entity (entity) by using RRC signaling. The terminal determines time domain scheduling information according to the entity, for example, determines at least one of the following parameters: K2, mappingType, and startSymbolAndLength. In this way, the time domain scheduling information of the PUSCH no longer needs to be determined based on the time domain resource assignment field of the scheduling DCI. The network device indicates, by using the time domain resource assignment field (for example, four bits) of the scheduling DCI format, that the terminal does not need to monitor a PDCCH in subsequent N slots or N PDCCH monitoring periods.

It should be noted that the second PDCCH is a PDCCH for transmitting the DCI format 0_0, the DCI format 0_1, the DCI format 1_0, and/or the DCI format 1_1. A 4-bit field may be used to indicate only a value of N and does not indicate other information. In addition, in addition to the value of N, the 4-bit field may further indicate a DCI format of the second PDCCH. For example, one of the four bits is used to indicate a DCI format, for example, an uplink or a downlink, and the remaining three bits are used to indicate the value of N. Alternatively, two of the four bits are used to indicate a DCI format, for example, a total of four formats of an uplink or a downlink back-off DCI or an uplink or a downlink non-back-off DCI, and the remaining two bits are used to indicate the value of N.

In a second example, a carrier indicator (Carrier indicator) field of the scheduling DCI format is used to indicate that the terminal does not need to monitor the second PDCCH in subsequent N slots, N monitoring periods of the second PDCCH, or N monitoring slots in a monitoring period of the second PDCCH.

The network device indicates, by using the carrier indicator field (for example, three bits) of the scheduling DCI format, that the second PDCCH does not need to be monitored in subsequent N slots, N PDCCH monitoring periods, or N monitoring slots in a PDCCH monitoring period. The second PDCCH is a PDCCH for transmitting the DCI format 0_0, the DCI format 0_1, the DCI format 1_0, and/or the DCI format 1_1. A 3-bit field may be used to indicate only a value of N and does not indicate other information. Besides, in addition to the value of N, the 3-bit field may further indicate a DCI format of the second PDCCH. For example, one of the three bits is used to indicate a DCI format, for example, an uplink or a downlink, and the remaining two bits are used to indicate the value of N. Alternatively, two of the three bits are used to indicate a DCI format, for example, a total of four formats of an uplink or a downlink back-off DCI or an uplink or a downlink non-back-off DCI, and the remaining one bit is used to indicate the value of N.

It should be noted that the terminal supports the foregoing solution when cross-carrier scheduling is not configured.

In a third example, a bandwidth part indicator (Bandwidth part indicator) field of the scheduling DCI format is used to indicate that the terminal does not need to monitor the second PDCCH in subsequent N slots, N PDCCH monitoring periods, or N monitoring slots in a PDCCH monitoring period.

The bandwidth part indicator (Bandwidth part indicator) field (for example, two bits) of the scheduling DCI format is used to indicate that the second PDCCH does not need to be monitored in subsequent N slots, N PDCCH monitoring periods, or N monitoring slots in a PDCCH monitoring period. The second PDCCH is a PDCCH for transmitting the DCI format 0_0, the DCI format 0_1, the DCI format 1_0, and/or the DCI format 1_1. A 2-bit field may be used to indicate only a value of N and does not indicate other information. Besides, in addition to the value of N, the 2-bit field may further indicate a DCI format of the second PDCCH. For example, one of the two bits is used to indicate a DCI format, for example, an uplink or a downlink, and the remaining one bit is used to indicate the value of N.

It should be noted that the terminal supports the foregoing solution when cross-BWP scheduling is not configured.

In a fourth example, a PDSCH-hybrid automatic repeat request (Hybrid Automatic Repeat Request, HARQ) feedback timing indicator (PDSCH-to-HARQ_feedback timing indicator) field of the scheduling DCI format is used to indicate that the terminal does not need to monitor the second PDCCH in subsequent N slots, N PDCCH monitoring periods, or N monitoring slots in a PDCCH monitoring period.

It should be noted that when the first PDCCH is in the DCI format 1_0 or the DCI format 1_1, the network device may indicate, by using a PDSCH-to-HARQ-feedback timing indicator field (for example, three bits) of the first PDCCH, that the second PDCCH does not need to be monitored in subsequent N slots, N PDCCH monitoring periods, or N monitoring slots in a PDCCH monitoring period. The second PDCCH is a PDCCH for transmitting the DCI format 0_0, the DCI format 0_1, the DCI format 1_0, and/or the DCI format 1_1. A 3-bit field may be used to indicate only a value of N and does not indicate other information. Besides, in addition to the value of N, the 3-bit field may further indicate a DCI format of the second PDCCH. For example, one of the three bits is used to indicate a DCI format, for example, an uplink or a downlink, and the remaining two bits are used to indicate the value of N. Alternatively, two of the three bits are used to indicate a DCI format, for example, a total of four formats of an uplink or a downlink back-off DCI or an uplink or a downlink non-back-off DCI, and the remaining one bit is used to indicate the value of N.

It should be noted that the network device may semi-persistently indicate a value of the PDSCH-to-HARQ_feedback timing indicator by using RRC signaling.

In a fifth example, a combination of at least two of a time domain resource assignment field, a carrier indicator field, a bandwidth part indicator field, and a hybrid automatic repeat request feedback timing indicator field is used to indicate that the terminal does not need to monitor the second PDCCH in subsequent N slots, N PDCCH monitoring periods, or N monitoring slots in a PDCCH monitoring period.

When the first PDCCH is in the DCI format 0_0 or the DCI format 0_1, the network device indicates, by using a combination of at least two (six bits) of a time domain resource assignment field, a carrier indicator field, and a bandwidth part indicator field, that the second PDCCH does not need to be monitored in subsequent N slots, N PDCCH monitoring periods, or N monitoring slots in a PDCCH monitoring period. The second PDCCH is a PDCCH for transmitting the DCI format 0_0, the DCI format 0_1, the DCI format 1_0, and/or the DCI format 1_1. A 6-bit field may be used to indicate only a value of N and does not indicate other information. Besides, in addition to the value of N, the 6-bit field may further indicate a DCI format of the second PDCCH. For example, one of the six bits is used to indicate a DCI format, for example, an uplink or a downlink, and the remaining five bits are used to indicate the value of N. Alternatively, two of the six bits are used to indicate a DCI format, for example, a total of four formats of an uplink or a downlink back-off DCI or an uplink or a downlink non-back-off DCI, and the remaining four bits are used to indicate the value of N.

When the first PDCCH is in the DCI format 1_0 or the DCI format 1_1, the network device indicates, by using a combination of at least two (six bits) of a time domain resource assignment field, a carrier indicator field, a bandwidth part indicator field, and a hybrid automatic repeat request feedback timing indicator field, that the second PDCCH does not need to be monitored in subsequent N slots, N PDCCH monitoring periods, or N monitoring slots in a PDCCH monitoring period. The second PDCCH is a PDCCH for transmitting the DCI format 0_0, the DCI format 0_1, the DCI format 1_0, and/or the DCI format 1_1. A 6-bit field may be used to indicate only a value of N and does not indicate other information. Besides, in addition to the value of N, the 6-bit field may further indicate a DCI format of the second PDCCH. For example, one of the six bits is used to indicate a DCI format, for example, an uplink or a downlink, and the remaining five bits are used to indicate the value of N. Alternatively, two of the six bits are used to indicate a DCI format, for example, a total of four formats of an uplink or a downlink back-off DCI or an uplink or a downlink non-back-off DCI, and the remaining four bits are used to indicate the value of N.

The foregoing is a scenario in which the indicator field indicates only one monitoring behavior (for example, the monitoring behavior 1). In addition, the network device may further simultaneously indicate a combination of a plurality of monitoring behaviors (for example, a combination of the monitoring behaviors 1 and 4) by using the indicator field. For example, the time domain resource assignment field includes four bits. When values of the four bits are "0000", the terminal is instructed to monitor the second PDCCH according to the received target signaling. Other values are used to indicate the value of N. It should be noted that indicating a combination of a plurality of monitoring behaviors by another indicator field is similar to this, and is not listed one by one in the embodiments of the present disclosure.

In addition, it should be noted that the scheduling DCI of the embodiments of the present disclosure is visible to a terminal of R16 and later versions (a new dedicated indicator field is added to the scheduling DCI or the meaning of an existing field is redefined). After receiving the scheduling DCI indicating a PDCCH monitoring behavior, the terminal does not need to report acknowledgement (ACK) information to the network device. After not receiving the scheduling DCI, the terminal does not need to report negative acknowledgement (NACK) information to the network device either.

Further, when the indicator field of the scheduling DCI indicates the monitoring behavior 1, after step 22, the method further includes: monitoring the second PDCCH after the first transmission time according to the received target signaling. For example, after N slots, N PDCCH monitoring periods, or N monitoring slots in a PDCCH monitoring period indicated by the scheduling DCI, the terminal monitors the second PDCCH according to a monitoring parameter of a search space configured by the network device (for example, configured by using RRC signaling). It should be noted that if the second PDCCH is monitored after the first PDCCH is monitored (including the first transmission time), and the second PDCCH carries the scheduling DCI, the terminal performs subsequent PDCCH monitoring according to the scheduling DCI in the second PDCCH. If the second PDCCH is not monitored or no new scheduling DCI is detected from the second PDCCH, the terminal performs subsequent PDCCH monitoring according to the received target signaling.

Further, when the indicator field of the scheduling DCI indicates the monitoring behavior 1 and/or the monitoring behavior 2, before step 21, the method further includes: sending reporting information to the network device, where the reporting information is used to indicate skipping monitoring the second PDCCH within the first transmission time, or whether to monitor the second PDCCH within the second transmission time. That is, the terminal sends the reporting information to the network device according to a scheduling requirement of the terminal. When there is no scheduling requirement, the reporting information that indicates skipping monitoring the second PDCCH within the first transmission time is reported, or the reporting information that indicates whether to monitor the second PDCCH within the second transmission time is reported according to a service scheduling requirement. The network device may generate the scheduling DCI with reference to the reporting information, to indicate a subsequent monitoring behavior of the terminal.

In the embodiments of the present disclosure, a start time of step 22, that is, a validity time of an indicator field that is in the scheduling DCI and that indicates a monitoring behavior of the terminal is one of the following:
- the next slot after the slot of the scheduling DCI, that is, a next slot after the terminal receives the scheduling DCI;
- the slot that is time gap after the slot of the scheduling DCI, where the time gap is pre-defined or configured by the network device, that is, there is a gap between receiving the scheduling DCI and the indicator field taking effect, and in this gap, the terminal monitors a PDCCH according to a previous monitoring behavior rule;
- the $M^{th}$ slot that is after the slot of ACK information of a physical downlink shared channel PDSCH scheduled by the scheduling DCI, where M is a positive integer; and
- the $L^{th}$ slot that is after the slot of a physical uplink shared channel PUSCH scheduled by the scheduling DCI, where L is a positive integer. Values of L and M may be pre-defined or configured by the network device.

In a transmission failure scenario, when the new transmission of data channel or the retransmission of data channel scheduled by the first PDCCH fails, where a PDSCH is used as an example, if the terminal obtains through demodulation that a PDSCH initially transmitted or retransmitted fails, the terminal reports a NACK. After successfully receiving the scheduling DCI indicating the monitoring behavior (for example, the monitoring behavior 1), the terminal directly does not monitor a PDCCH within the first transmission time according to indication of the scheduling DCI. In this case, after the first transmission time, the terminal monitors the third PDCCH used for PDSCH retransmission scheduling. A PUSCH is used as an example. If transmission of a PUSCH initially transmitted or retransmitted fails, after successfully receiving the scheduling DCI indicating the monitoring behavior (for example, the monitoring behavior 1), the terminal directly does not monitor a PDCCH within the first transmission time according to indication of the scheduling DCI. In this case, after the first transmission time, the terminal monitors the third PDCCH used for PUSCH retransmission scheduling.

To reduce a retransmission delay, a specific implementation of step 22 may include, but is not limited to, the following manner: when the new transmission of data channel or the retransmission of data channel scheduled by the first PDCCH fails, determining, according to the scheduling DCI, whether to monitor the second PDCCH on a target resource. The target resource is a time domain resource other than a time domain resource of a third PDCCH that schedules the retransmission of data channel. The third PDCCH is used for scheduling of the retransmission of data channel. Further, in a transmission failure scenario, the method further includes: when the new transmission of data channel or the retransmission of data channel scheduled by the first PDCCH fails, monitoring the third PDCCH on the time domain resource of the third PDCCH. A PDSCH is used as an example. If the terminal obtains through demodulation that a PDSCH initially transmitted or retransmitted fails, the terminal reports a NACK. After successfully receiving the scheduling DCI indicating the monitoring behavior (for example, the monitoring behavior 1), according to indication of the scheduling DCI, the terminal does not monitor a PDCCH within the first transmission time on a resource other than the time domain resource of the third PDCCH (used for PDSCH retransmission scheduling). A PUSCH is used as an example. If transmission of a PUSCH initially transmitted or retransmitted fails, after successfully receiving the scheduling DCI indicating the monitoring behavior (for example, the monitoring behavior 1), according to indication of the scheduling DCI, the terminal does not monitor a PDCCH within the first transmission time on a resource other than the time domain resource of the third PDCCH (used for PUSCH retransmission scheduling).

In the channel monitoring indication method of the embodiments of the present disclosure, the scheduling DCI is used to dynamically indicate to the terminal whether to monitor the PDCCH, so that the terminal monitors the PDCCH more flexibly. This can avoid unnecessary PDCCH monitoring and help the terminal save electricity.

The foregoing embodiments describe the channel monitoring indication method in different scenarios. The following further describes the terminal corresponding to the channel monitoring indication method with reference to the accompanying drawings.

Figure 3:
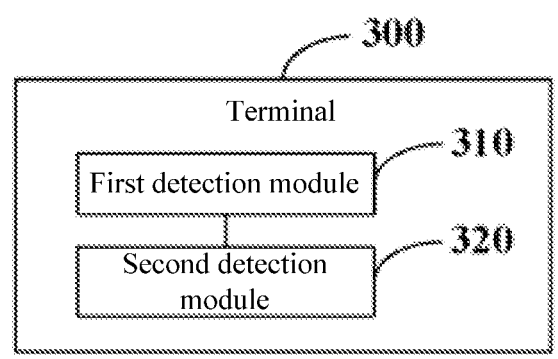
FIG. 3 is a schematic diagram of a modular structure of a terminal according to an embodiment of the present disclosure.

As shown in FIG. 3, a terminal 300 in an embodiment of the present disclosure can implement details of the foregoing method in the foregoing embodiments: monitoring a first physical downlink control channel PDCCH; and if scheduling downlink control information DCI is received from the first PDCCH, determining, according to the scheduling DCI, whether to monitor a second PDCCH. The same effect is achieved. The terminal 300 specifically includes the following functional modules:
- a first monitoring module 310, configured to monitor a first physical downlink control channel PDCCH; and
- a second monitoring module 320, configured to: if scheduling downlink control information DCI is received from the first PDCCH, determine, according to the scheduling DCI, whether to monitor a second PDCCH.

The terminal 300 further includes:
- a third monitoring module, configured to: if the scheduling DCI is not received from the first PDCCH, monitor the second PDCCH according to received target signaling, where the target signaling is different from the scheduling DCI, and the target signaling is used to indicate a monitoring parameter associated with the second PDCCH.

The scheduling DCI includes an indicator field used for indicating at least one of the following:
- skipping monitoring the second PDCCH within a first transmission time;
- whether to monitor the second PDCCH within a second transmission time;
- a monitoring parameter associated with the second PDCCH;
- a connected discontinuous reception CDRX parameter; and
- monitoring the second PDCCH according to received target signaling, where the target signaling is different from the scheduling DCI, and the target signaling is used to indicate a monitoring parameter associated with the second PDCCH.

The indicator field includes a dedicated indicator field, or the indicator field includes at least one of the following fields:
- a time domain resource assignment field, a carrier indicator field, a bandwidth part indicator field, and a hybrid automatic repeat request feedback timing indicator field.

The second PDCCH corresponds to at least one DCI format, and/or the second PDCCH corresponds to at least one search space.

The CDRX parameter includes: at least one of a CDRX period, a CDRX offset, and a CDRX onDuration period.

The indicator field is used to indicate that the monitoring parameter associated with the second PDCCH is one parameter in a monitoring parameter candidate set, where the monitoring parameter candidate set is indicated by the network device by using radio resource control RRC signaling.

The indicator field is used to indicate that the CDRX parameter is one parameter in a CDRX parameter candidate set, where the CDRX parameter candidate set is indicated by the network device by using radio resource control RRC signaling.

The terminal 300 further includes:
a fourth monitoring module, configured to: monitor the second PDCCH after the first transmission time according to the received target signaling.

The first transmission time or the second transmission time is: N time domain transmission units, N monitoring periods of the second PDCCH, or N monitoring time domain transmission units in a monitoring period of the second PDCCH, where the time domain transmission unit includes: a slot, a mini-slot, a millisecond, or a time domain symbol, and N is a positive integer.

The terminal 300 further includes:
a reporting module, configured to send reporting information to the network device, where the reporting information is used to indicate skipping monitoring the second PDCCH within the first transmission time, or whether to monitor the second PDCCH within the second transmission time.

The monitoring parameter associated with the second PDCCH includes: at least one of a monitoring period, a monitoring offset, and a monitoring duration.

A start time of the step of determining, according to the scheduling DCI, whether to monitor a second PDCCH is one of the following:
the next slot after the slot of the scheduling DCI;
the slot that is time gap after the slot of the scheduling DCI, where the time gap is pre-defined or configured by the network device;
the $M^{th}$ slot that is after the slot of acknowledgement ACK information of a physical downlink shared channel PDSCH scheduled by the scheduling DCI, where M is a positive integer; and
the $L^{th}$ slot that is after the slot of a physical uplink shared channel PUSCH scheduled by the scheduling DCI, where L is a positive integer.

The second monitoring module 320 includes:
a first monitoring submodule, configured to: when the new transmission of data channel or the retransmission of data channel scheduled by the first PDCCH fails, determine, according to the scheduling DCI, whether to monitor the second PDCCH on a target resource, where the target resource is a time domain resource other than a time domain resource of a third PDCCH that schedules the retransmission of data channel.

The terminal 300 further includes:
a fifth monitoring module, configured to: when the new transmission of data channel or the retransmission of data channel scheduled by the first PDCCH fails, determining to monitor the third PDCCH on the time domain resource of the third PDCCH.

A monitoring parameter of the first PDCCH is configured by the network device, and the monitoring parameter includes: at least one of a monitoring period, a monitoring offset, and a monitoring duration.

It should be noted that during actual implementation, the various functional modules of the terminal may be completely or partially integrated into one physical entity, or may be physically separated. For example, the first monitoring module 310, the second monitoring module 320, the third monitoring module, the fourth monitoring module, and the fifth monitoring module may be transceiver components separately disposed or may be integrated into one transceiver. It should be noted that the implementations of other modules is similar. In the process of implementation, all the foregoing modules can be implemented through an integrated hardware logic circuit in a processor element or an instruction in a form of software.

It should be noted that in the terminal of the embodiments of the present disclosure, the scheduling DCI is used to dynamically indicate whether to monitor the PDCCH, so that the terminal monitors the PDCCH more flexibly. This can avoid unnecessary PDCCH monitoring and help the terminal save electricity.

Figure 4:
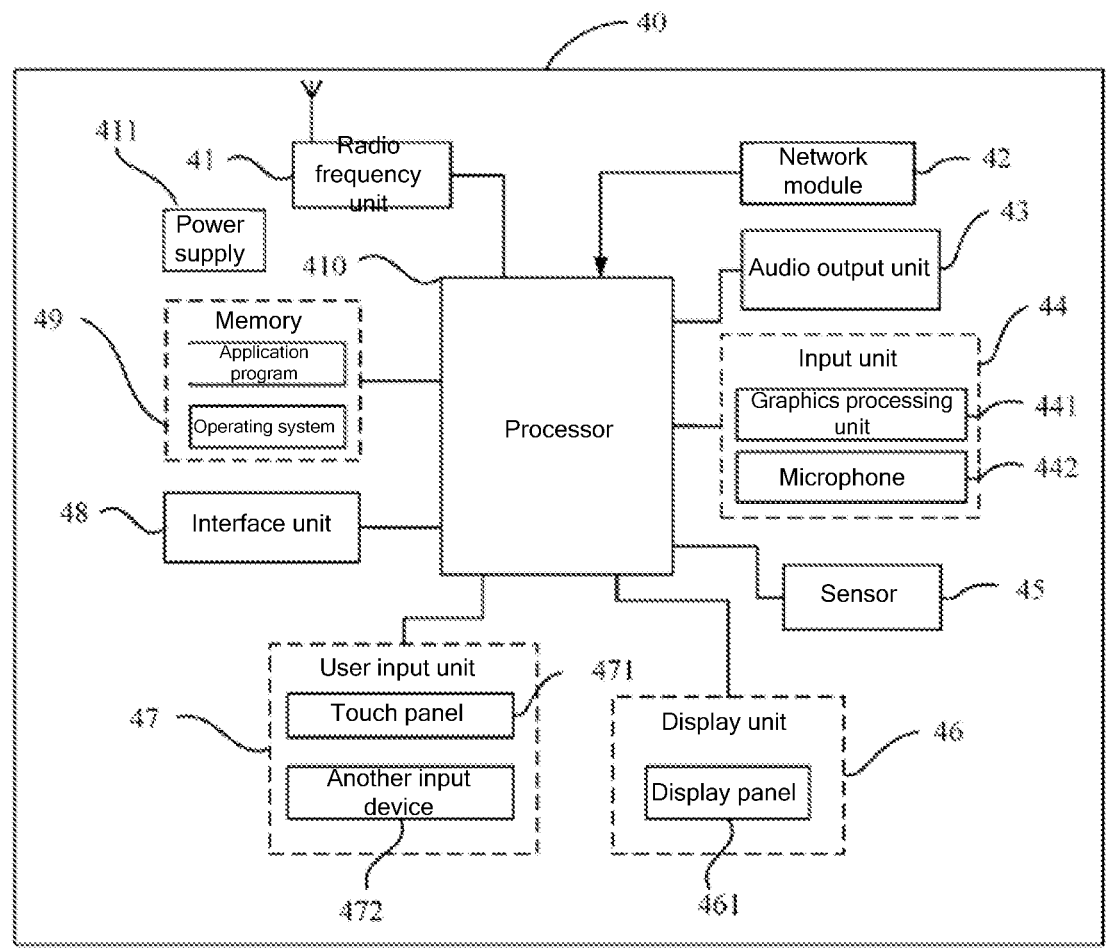
FIG. 4 is a block diagram of a terminal according to an embodiment of the present disclosure.

To better achieve the foregoing objective, further, FIG. 4 is a schematic structural diagram of hardware of a terminal for implementing the various embodiments of the present disclosure. The terminal 40 includes, but is not limited to: components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute a limitation on the terminal. The terminal may include more or fewer components than that shown in the figure, or some components may be combined, or an arrangement of different components is used. In this embodiment of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 41 is configured to receive and send data under control of the processor 410, and is specifically configured to: monitor a first physical downlink control channel PDCCH; and a second monitoring module, configured to: if scheduling downlink control information DCI is received from the first PDCCH, determine, according to the scheduling DCI, whether to monitor a second PDCCH.

In the terminal of the embodiments of the present disclosure, the scheduling DCI is used to dynamically indicate whether to monitor the PDCCH, so that the terminal monitors the PDCCH more flexibly. This avoids unnecessary PDCCH monitoring and helps the terminal save electricity.

It should be understood that in this embodiment of the present disclosure, the radio frequency unit 41 may be configured to receive and send signals in a process of receiving and sending information or calling. Specifically, the radio frequency unit 41 receives downlink data from a base station for processing by the processor 410, and sends uplink data to the base station. Generally, the radio frequency unit 41 includes, but is not limited to, an antenna, at least one amplifier, a transceiver, a coupler, a low noise amplifier, a duplexer, and the like. In addition, the radio frequency unit 41 may further communicate with another device by using a wireless communication system and network.

The terminal provides wireless broadband Internet access for a user by using the network module 42, for example, helps the user send and receive an email, browse a web page, and access streaming media.

The audio output unit 43 can convert audio data received by the radio frequency unit 41 or the network module 42 or stored in the memory 49 into an audio signal, and output the audio signal as sound. In addition, the audio output unit 43 can also provide audio output related to a specific function performed by the terminal 40 (for example, call signal receiving sound or message receiving sound). The audio output unit 43 includes a speaker, a buzzer, a telephone receiver, and the like.

The input unit 44 is configured to receive audio or video signals. The input unit 44 may include a Graphics Processing Unit (GPU) 441 and a microphone 442. The graphics processing unit 441 processes image data of a static picture or a video obtained by an image capture apparatus (for example, a camera) in a video capture mode or an image capture mode. A processed image frame can be displayed on the display unit 46. The image frames processed by the graphics processing unit 441 can be stored in the memory 49 (or another storage medium) or sent by the radio frequency unit 41 or the network module 42. The microphone 442 can receive sound and can process such sound into audio data. The processed audio data may be converted in a telephone call mode into a format that can be sent by the radio frequency unit 41 to a mobile communications base station for output.

The terminal 40 further includes at least one sensor 45, such as a light sensor, a motion sensor, and another sensor. Specifically, the light sensor includes an ambient light sensor and a proximity sensor, where the ambient light sensor can adjust brightness of the display panel 461 based on brightness of ambient light, and the proximity sensor can turn off the display panel 461 and/or backlight when the terminal 40 moves towards the ear. As a type of motion sensor, an accelerometer sensor can detect the magnitude of acceleration in various directions (usually three axes) and detect the magnitude and the direction of gravity when stationary, and can be configured to identify terminal postures (such as switching between a portrait mode and a landscape mode, related games, and magnetometer posture calibration), and perform functions related to vibration identification (such as a pedometer and a knock), and the like. The sensor 45 may further include a fingerprint sensor, a pressure sensor, an iris sensor, a molecular sensor, a gyroscope, a barometer, a hygrometer, a thermometer, an infrared sensor, or the like. Details are not described herein.

The display unit 46 is configured to display information entered by a user or information provided for the user. The display unit 46 may include the display panel 461, and the display panel 461 may be configured in a form of a liquid crystal display (LCD), an organic light-emitting diode (OLED), or the like.

The user input unit 47 may be configured to receive inputted digit or character information and generate key signal input related to user setting and function control of the terminal. Specifically, the user input unit 47 includes a touch panel 471 and another input device 472. The touch panel 471, also called a touch screen, may collect a touch operation of the user on or near the touch panel 471 (for example, an operation performed by the user with any suitable object or accessory such as a finger or a stylus on or near the touch panel 471). The touch panel 471 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 410, receives a command sent by the processor 410, and executes the command. In addition, the touch panel 471 can be implemented in various types such as resistive, capacitive, infrared, and a surface acoustic wave. In addition to the touch panel 471, the user input unit 47 may further include the another input device 472. Specifically, the another input device 472 may include, but is not limited to, a physical keyboard, function keys (such as a volume control key and a switch key), a trackball, a mouse, and a joystick. Details are not described herein.

Further, the touch panel 471 can cover the display panel 461. When detecting a touch operation on or near the touch panel 471, the touch panel 471 transmits the touch operation to the processor 410 to determine a type of a touch event. Then, the processor 410 provides corresponding visual output on the display panel 461 based on the type of the touch event. In FIG. 4, the touch panel 471 and the display panel 461 are used as two independent components to implement input and output functions of the terminal. However, in some embodiments, the touch panel 471 and the display panel 461 may be integrated to implement the input and output functions of the terminal. This is not specifically limited herein.

The interface unit 48 is an interface connecting an external apparatus to the terminal 40. For example, the external apparatus may include a wired or wireless headphone port, an external power supply (or a battery charger) port, a wired or wireless data port, a memory card port, a port used to connect to an apparatus having an identification module, an audio input/output (I/O) port, a video I/O port, an earphone port, and the like. The interface unit 48 may be configured to receive input (for example, data information and power) from the external apparatus and transmit the received input to one or more elements in the terminal 40, or may be configured to transmit data between the terminal 40 and the external apparatus.

The memory 49 may be configured to store software programs and various data. The memory 49 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 49 may include a high-speed random access memory or a nonvolatile memory, for example, at least one magnetic disk storage device, a flash memory device, or another volatile solid-state storage device.

The processor 410 is a control center of the terminal. The processor 410 uses various interfaces and lines to connect the various parts of the entire terminal, and performs various functions of the terminal and processes data by running or executing software programs and/or modules stored in the memory 49 and invoking data stored in the memory 49, to monitor the terminal as a whole. The processor 410 may include one or more processing units. Optionally, the processor 410 may integrate an application processor and a modem processor. The application processor mainly deals with an operating system, a user interface, an application program, and the like. The modem processor mainly deals with wireless communication. It may be understood that alternatively, the modem processor may not be integrated into the processor 410.

The terminal 40 may further include a power supply 411 (such as a battery) that supplies power to each component. Optionally, the power supply 411 may be logically connected to the processor 410 by using a power management system, to implement functions such as charging, discharging, and power consumption management by using the power management system.

In addition, the terminal 40 includes some function modules not shown, and details are not described herein again.

Optionally, an embodiment of the present disclosure further provides a terminal, including a processor 410, a memory 49, and a computer program stored in the memory 49 and executable on the processor 410. When the computer program is executed by the processor 410, each process of the embodiments of the foregoing channel monitoring indication method is implemented, and the same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, the wireless terminal is a device such as a Personal Communication Service (PCS) telephone, a cordless telephone, a Session Initiation Protocol (SIP) phone, a Wireless Local Loop (WLL) station, or a PDA. The wireless terminal may also be referred to as a system, a Subscriber Unit, a Subscriber Station, a Mobile Station, a Mobile, a Remote Station, a Remote Terminal, an Access Terminal, a User Terminal, a User Agent, or a User Device or User Equipment. This is not limited herein.

An embodiment of the present disclosure further provides a computer-readable storage medium, where the computer-readable storage medium stores a computer program, the computer program, when executed by a processor, implements the processes of the foregoing embodiments of the channel monitoring indication method, and the same technical effects can be achieved. To avoid repetition, details are not described herein again. The computer-readable storage medium includes a Read-Only Memory (ROM), a Random Access Memory (RAM), a magnetic disk, an optical disc, or the like.

The foregoing embodiment describes the channel monitoring indication method of the present disclosure on the terminal side. The following embodiment further describes the channel monitoring indication method on a network device side with reference to the accompanying drawings.

As shown in FIG. 5, the channel monitoring indication method in the embodiments of the present disclosure is applied to a network device side. The method includes the following steps:

Step 51: Send a first physical downlink control channel PDCCH, where the first PDCCH carries scheduling downlink control information DCI, and the scheduling DCI is used to indicate to a terminal whether to monitor a second PDCCH.

A monitoring parameter of the first PDCCH is configured by a network device, where the monitoring parameter includes: at least one of a monitoring period, a monitoring offset, and a monitoring duration. In this way, the scheduling DCI is used to dynamically indicate a monitoring behavior of the terminal. This can avoid unnecessary PDCCH monitoring of the terminal and save electricity of the terminal. In the embodiments of the present disclosure, the second PDCCH corresponds to at least one DCI format, and/or the second PDCCH corresponds to at least one search space. For example, the second PDCCH corresponds to at least one scheduling DCI format, or corresponds to at least one non-scheduling DCI format, or corresponds to at least one of a scheduling DCI format and a non-scheduling DCI format.

In the embodiments of the present disclosure, the scheduling DCI includes an indicator field used for indicating at least one of the following monitoring behavior:

1. Skip monitoring the second PDCCH within a first transmission time, where the first transmission time is: N time domain transmission units, N monitoring (monitoring) periods of the second PDCCH, or N monitoring time domain transmission units in a monitoring period of the second PDCCH, where the time domain transmission unit includes: a slot, a mini-slot, a millisecond, or a time domain symbol, and N is a positive integer. This scenario corresponds to the monitoring behavior 1, and therefore is not repeated herein.

2. Whether to monitor the second PDCCH within a second transmission time, where the second transmission time is: N time domain transmission units, N monitoring (monitoring) periods of the second PDCCH, or N monitoring time domain transmission units in a monitoring period of the second PDCCH, where the time domain transmission unit includes: a slot, a mini-slot, a millisecond, or a time domain symbol, and N is a positive integer. This scenario corresponds to the monitoring behavior 2, and therefore is not repeated herein.

3. The monitoring parameter associated with the second PDCCH, where the monitoring parameter includes: at least one of a monitoring period, a monitoring offset, and a monitoring duration. For example, the indicator field includes 2 bits. 00 indicates that the monitoring period is 5 slots, 01 indicates that the monitoring period is 10 slots, 10 indicates that the monitoring period is 20 slots, and 11 indicates other purposes. A network device may further indicate a monitoring parameter candidate set by using radio resource control RRC signaling, the monitoring parameter candidate set includes at least one monitoring parameter associated with the second PDCCH, and the indicator field is used to indicate one parameter in the monitoring parameter candidate set. This scenario corresponds to the monitoring behavior 3, and therefore is not repeated herein.

4. A connected discontinuous reception CDRX parameter, where the CDRX parameter includes: at least one of a CDRX period, a CDRX offset, and a CDRX onDuration period. A network device may further indicate a CDRX parameter candidate set by using radio resource control RRC signaling, the CDRX parameter candidate set includes at least one CDRX parameter, and the indicator field is used to indicate one parameter in the CDRX parameter candidate set. This scenario corresponds to the monitoring behavior 4, and therefore is not repeated herein.

5. Monitor the second PDCCH according to received target signaling, where the target signaling is different from the scheduling DCI, and the target signaling is used to indicate a monitoring parameter associated with the second PDCCH. This scenario corresponds to the monitoring behavior 5, and therefore is not repeated herein.

In the embodiments, the indicator field of the scheduling DCI may include a dedicated indicator field, or the indicator field includes at least one of the following fields: a time domain resource assignment field, a carrier indicator field, a bandwidth part indicator field, and a hybrid automatic repeat request feedback timing indicator field. It should be noted that the indicator field of the scheduling DCI may indicate any one of the monitoring behaviors 1 to 5, or may indicate a combination of the monitoring behaviors 1 to 5 by using different values of different bits in the indicator field. Examples of adding a dedicated indicator field or reusing some existing fields for the scheduling DCI is similar to those in the related embodiments on the terminal side, and therefore are no longer repeated herein.

Further, when the indicator field of the scheduling DCI indicates the monitoring behavior 1, before step 51, the method further includes: receiving reporting information, where the reporting information is used to indicate skipping monitoring the second PDCCH within the first transmission time, or whether to monitor the second PDCCH within the second transmission time. The network device may generate the scheduling DCI with reference to the reporting information, to indicate a subsequent monitoring behavior of the terminal.

In the embodiments of the present disclosure, a start validity time of a field that is in the scheduling DCI and that indicates to the terminal whether to monitor the second PDCCH is one of the following:

the next slot after the slot of the scheduling DCI, that is, a next slot after the terminal receives the scheduling DCI;

the slot that is time gap after the slot of the scheduling DCI, where the time gap is pre-defined or configured by the network device, that is, there is a gap between receiving the scheduling DCI and the indicator field taking effect, and in this gap, the terminal monitors a PDCCH according to a previous monitoring behavior rule;

the $M^{th}$ slot that is after the slot of acknowledgement ACK information of a physical downlink shared channel PDSCH scheduled by the scheduling DCI, where M is a positive integer; and the $L^{th}$ slot that is after the slot of a physical uplink shared channel PUSCH scheduled by the scheduling DCI, where L is a positive integer. It should be noted that values of L and M may be pre-defined or configured by the network device.

In a transmission failure scenario, after step 51, the method further includes: when the new transmission of data channel or the retransmission of data channel scheduled by the first PDCCH fails, determining, according to the scheduling DCI, whether to send the second PDCCH on a target resource, where the target resource is a time domain resource other than a time domain resource of a third PDCCH that schedules the retransmission of data channel.

To reduce a retransmission delay, the method further includes: when the new transmission of data channel or the retransmission of data channel scheduled by the first PDCCH fails, sending the third PDCCH on the time domain resource of the third PDCCH. A PDSCH is used as an example. If the terminal obtains through demodulation that a PDSCH initially transmitted or retransmitted fails, the terminal reports a NACK. After successfully receiving the scheduling DCI indicating the monitoring behavior (for example, the monitoring behavior 1), according to indication of the scheduling DCI, the terminal does not monitor a PDCCH within the first transmission time on a resource other than the time domain resource of the third PDCCH (used for PDSCH retransmission scheduling). A PUSCH is used as an example. If transmission of a PUSCH initially transmitted or retransmitted fails, after successfully receiving the scheduling DCI indicating the monitoring behavior (for example, the monitoring behavior 1), according to indication of the scheduling DCI, the terminal does not monitor a PDCCH within the first transmission time on a resource other than the time domain resource of the third PDCCH (used for PUSCH retransmission scheduling).

In the channel monitoring indication method of the embodiments of the present disclosure, the network device sends the PDCCH carrying the scheduling DCI to the terminal, where the scheduling DCI is used to indicate to the terminal whether to monitor the second PDCCH. The terminal determines, according to dynamic indication of the scheduling DCI, whether to monitor a PDCCH, so that the terminal monitors a PDCCH more flexibly. This avoids unnecessary PDCCH monitoring and helps the terminal save electricity.

The foregoing embodiments describe in detail the channel monitoring indication method in different scenarios. The following embodiments further describe the network device corresponding to the channel monitoring indication method with reference to the accompanying drawings.

Figure 6:
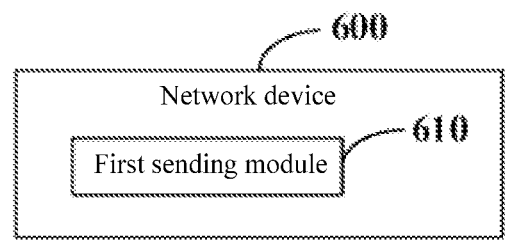
FIG. 6 is a schematic diagram of a modular structure of a network device according to an embodiment of the present disclosure.

As shown in FIG. 6, a network device 600 in an embodiment of the present disclosure can implement details of the foregoing method in the foregoing embodiments: sending a first physical downlink control channel PDCCH, where the first PDCCH carries scheduling downlink control information DCI and the scheduling DCI is used to indicate to a terminal whether to monitor a second PDCCH. The same effect is achieved. The network device 600 specifically includes the following functional modules:

a first sending module 610, configured to send a first physical downlink control channel PDCCH, where the first PDCCH carries scheduling downlink control information DCI, and the scheduling DCI is used to indicate to a terminal whether to monitor a second PDCCH.

The scheduling DCI includes an indicator field used for indicating at least one of the following:

skipping monitoring the second PDCCH within a first transmission time;

whether to monitor the second PDCCH within a second transmission time;

a monitoring parameter associated with the second PDCCH;

a connected discontinuous reception CDRX parameter; and monitoring the second PDCCH according to received target signaling, where the target signaling is different from the scheduling DCI, and the target signaling is used to indicate a monitoring parameter associated with the second PDCCH.

The indicator field includes a dedicated indicator field, or the indicator field includes at least one of the following fields:

a time domain resource assignment field, a carrier indicator field, a bandwidth part indicator field, and a hybrid automatic repeat request feedback timing indicator field.

The second PDCCH corresponds to at least one DCI format, and/or the second PDCCH corresponds to at least one search space.

The CDRX parameter includes: at least one of a CDRX period, a CDRX offset, and a CDRX onDuration period.

A network device indicates a monitoring parameter candidate set by using radio resource control RRC signaling, the monitoring parameter candidate set includes at least one monitoring parameter associated with the second PDCCH, and the indicator field is used to indicate one parameter in the monitoring parameter candidate set.

The network device indicates a CDRX parameter candidate set by using radio resource control RRC signaling, the CDRX parameter candidate set includes at least one CDRX parameter, and the indicator field is used to indicate one parameter in the CDRX parameter candidate set.

The first transmission time or the second transmission time is: N time domain transmission units, N monitoring periods of the second PDCCH, or N monitoring time domain transmission units in a monitoring period of the second PDCCH, where the time domain transmission unit includes: a slot, a mini-slot, a millisecond, or a time domain symbol, and N is a positive integer.

The network device 600 further includes:
  a receiving module, configured to receive reporting information, where the reporting information is used to indicate skipping monitoring the second PDCCH within the first transmission time, or whether to monitor the second PDCCH within the second transmission time.

The monitoring parameter associated with the second PDCCH includes: at least one of a monitoring period, a monitoring offset, and a monitoring duration.

A start validity time of a field that is in the scheduling DCI and that indicates to the terminal whether to monitor the second PDCCH is one of the following:
  the next slot after the slot of the scheduling DCI;
  the slot that is time gap after the slot of the scheduling DCI, where the time gap is pre-defined or configured by the network device;
  the $M^{th}$ slot that is after the slot of acknowledgement ACK information of a physical downlink shared channel PDSCH scheduled by the scheduling DCI, where M is a positive integer; and
  the $L^{th}$ slot that is after the slot of a physical uplink shared channel PUSCH scheduled by the scheduling DCI, where L is a positive integer.

The network device 600 includes:
  a second sending module, configured to: when the new transmission of data channel or the retransmission of data channel scheduled by the first PDCCH fails, determine, according to the scheduling DCI, whether to send the second PDCCH on a target resource, where the target resource is a time domain resource other than a time domain resource of a third PDCCH that schedules the retransmission of data channel.

The network device 600 further includes:
  a third sending module, configured to: when the new transmission of data channel or the retransmission of data channel scheduled by the first PDCCH fails, send a third PDCCH on a time domain resource of the third PDCCH.

The network device 600 further includes:
  a configuration module, configured to configure a monitoring parameter for the first PDCCH, where the monitoring parameter includes: at least one of a monitoring period, a monitoring offset, and a monitoring duration.

It should be noted that during actual implementation, the various functional modules of the foregoing network device may be completely or partially integrated into one physical entity, or may be physically separated. For example, the first sending module 610 and the second sending module may be transceiver components separately disposed or may be integrated into one transceiver. It should be noted that the implementations of other modules is similar. In the process of implementation, all the foregoing modules can be implemented through an integrated hardware logic circuit in a processor element or an instruction in a form of software.

That is, it should be understood that the division of the various modules of the foregoing network device and terminal is merely logical function division, and during actual implementation, the various module may be completely or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or instructions in the form of software.

For example, the foregoing modules may be one or more integrated circuits configured to implement the foregoing method, for example, may be one or more Application Specific Integrated Circuits (ASICs), or one or more microprocessors, or one or more digital signal processors (DSPs), or one or more Field Programmable Gate Arrays (FPGAs). For another example, when one of the foregoing modules is implemented in the form of program code being scheduled by a processing element, the processing element may be a general-purpose processor, such as a Central Processing Unit (CPU) or another processor that can invoke program code. For another example, these modules may be integrated together and implemented in the form of a system-on-a-chip (SOC).

It should be noted that the network device of the embodiments of the present disclosure sends the PDCCH carrying the scheduling DCI to the terminal, where the scheduling DCI is used to indicate to the terminal whether to monitor the second PDCCH. The terminal determines, according to dynamic indication of the scheduling DCI, whether to monitor a PDCCH, so that the terminal monitors a PDCCH more flexibly. This avoids unnecessary PDCCH monitoring and helps the terminal save electricity.

To better achieve the foregoing objectives, an embodiment of the present disclosure further provides a network device, where the network device includes a processor, a memory, and a computer program stored in the memory and executable on the processor, where when the processor executes the computer program, the steps of the foregoing channel monitoring indication method are implemented. An embodiment of the present disclosure further provides a computer-readable storage medium, where the computer-readable storage medium stores a computer program, and when the computer program is executed by a processor, the steps in the foregoing channel monitoring indication method are implemented.

Figure 7:
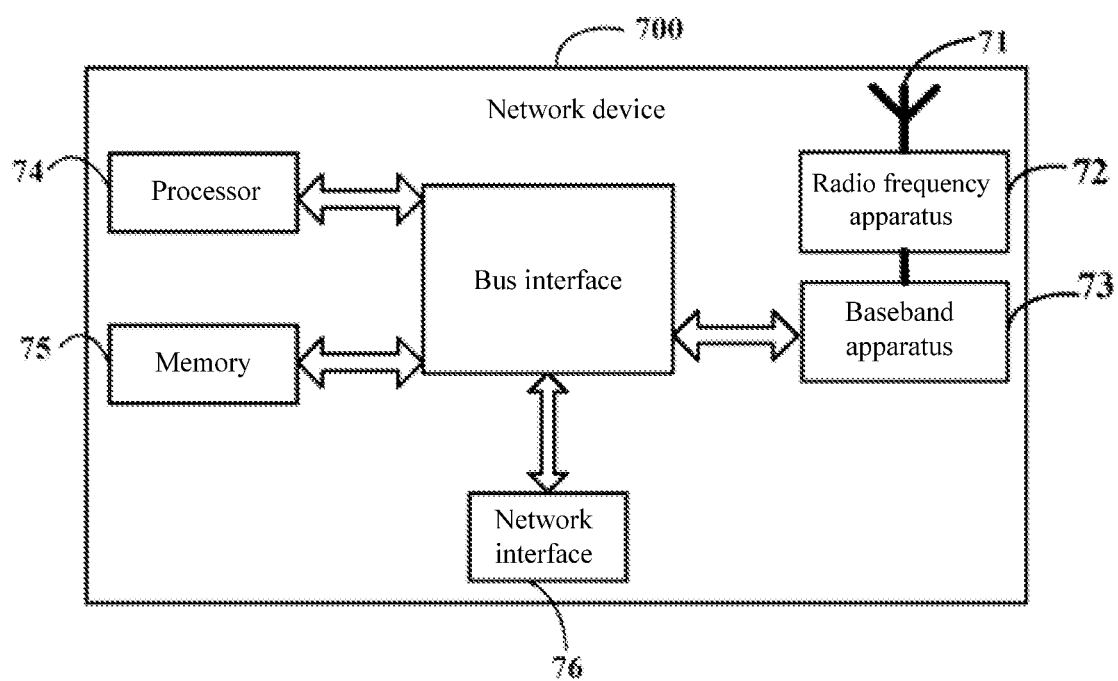
FIG. 7 is a block diagram of a network device according to an embodiment of the present disclosure.

Specifically, an embodiment of the present disclosure further provides a network device. As shown in FIG. 7, the network device 700 includes: an antenna 71, a radio frequency apparatus 72, and a baseband apparatus 73. The antenna 71 is connected to the radio frequency apparatus 72. In the uplink direction, the radio frequency apparatus 72 receives information through the antenna 71, and sends the received information to the baseband apparatus 73 for processing. In the downlink direction, the baseband apparatus 73 processes information to be sent and sends the information to the radio frequency apparatus 72, and the radio frequency apparatus 72 processes the received information and then sends the information through the antenna 71.

The foregoing band processing apparatus may be located in the baseband apparatus 73, and the method performed by the network device in the foregoing embodiment may be implemented in the baseband apparatus 73. The baseband apparatus 73 includes a processor 74 and a memory 75.

The baseband apparatus 73 may include, for example, at least one baseband board, and a plurality of chips are arranged on the baseband board. As shown in FIG. 7, one of the chips is, for example, the processor 74, which is connected to the memory 75, to invoke a program in the memory 75, so as to perform the operations of the network device shown in the foregoing method embodiment.

The baseband apparatus 73 may further include a network interface 76 for exchanging information with the radio frequency apparatus 72. The interface is, for example, a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors, one or more DSPs, or one or more field programmable gate arrays FPGAs. The storage element may be one memory or a collective term for a plurality of storage elements.

The memory 75 may be a volatile memory or a non-volatile memory, or may include both a volatile memory and a non-volatile memory. The non-volatile memory may be a ROM, a Programmable ROM (PROM), an Erasable PROM (EPROM), an Electrically EPROM (EEPROM), or a flash memory. The volatile memory may be a random access memory (Random Access Memory, RAM), which is used as an external cache. By way of exemplary but not restrictive description, many forms of RAMs are available, such as a Static RANI (SRAM), a Dynamic RAM (DRAM), a Synchronous DRAM (SDRAM), a Double Data Rate SDRAM (DDRSDRAM), an SDRAM (ESDRAM), a synchronous link DRAM (Synchlink DRAM or SLDRAM), and a Direct Rambus RAM (DRRAM). The memory 75 described in this application is intended to include but not limited to these and any other suitable types of memories.

Specifically, the network device in this embodiment of the present disclosure further includes a computer program stored in the memory 75 and executable on the processor 74, and the processor 74 invokes the computer program in the memory 75 to perform the method performed by the modules shown in FIG. 6.

Specifically, when being invoked by the processor 74, the computer program may be configured to perform: sending a first physical downlink control channel PDCCH, where the first PDCCH carries scheduling downlink control information DCI, and the scheduling DCI is used to indicate to a terminal whether to monitor a second PDCCH.

The network device of the embodiments of the present disclosure sends the PDCCH carrying the scheduling DCI to the terminal, where the scheduling DCI is used to indicate to the terminal whether to monitor the second PDCCH. The terminal determines, according to dynamic indication of the scheduling DCI, whether to monitor a PDCCH, so that the terminal monitors a PDCCH more flexibly. This avoids unnecessary PDCCH monitoring and helps the terminal save electricity.

A person of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer-readable storage medium. Based on this understanding, the essence of the technical solutions of the present disclosure, or the part contributing to the prior art, or some of the technical solutions may be presented in the form of software products. The computer software products are stored in a storage medium, and include a number of instructions to enable a computer device (which may be a personal computer, a server, a network device, or the like) to perform all or some of the steps of the methods described in various embodiments of the present disclosure. The storage medium includes various mediums, such as a Universal Serial Bus (USB) flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These divisions and/or re-combinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should be further noted that in the apparatuses and methods of the present disclosure, it is obvious that the components or the steps may be divided and/or recombined. These divisions and/or re-combinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The optional implementations of the present disclosure are described above. It should be noted that persons of ordinary skill in the art may further make several improvements and refinements without departing from the principles described in the present disclosure, and these improvements and refinements also fall within the protection scope of the present disclosure.

The invention claimed is:

1. A channel monitoring indication method performed by terminal side, the method comprising:
   monitoring a first Physical Downlink Control Channel (PDCCH); and
   when scheduling Downlink Control Information (DCI) is received from the first PDCCH, determining, according to the scheduling DCI, not to monitor a second PDCCH for a first transmission time duration,
   wherein the received scheduling DCI is in one of DCI formats: 0_1 or 1_1, and the scheduling DCI comprises an indicator field indicating that not monitoring the second PDCCH for the first transmission time duration.

2. The channel monitoring indication method according to claim 1, wherein after monitoring a first PDCCH, the method further comprises:
   when the scheduling DCI is not received from the first PDCCH, monitoring the second PDCCH according to received target signaling, wherein the target signaling is different from the scheduling DCI, and the target signaling indicates a monitoring parameter associated with the second PDCCH.

3. A terminal, comprising:
   a processor; and
   a memory having a computer program stored therein and running on the processor, wherein the computer program, when executed by the processor, causes the processor to implement operations comprising:
   monitoring a first Physical Downlink Control Channel (PDCCH), and
   determining not to monitor a second PDCCH for a first transmission time duration according to scheduling Downlink Control Information (DCI) when the scheduling DCI is received from the first PDCCH,
   wherein the received scheduling DCI is in one of DCI formats: 0_1 or 1_1, and the scheduling DCI comprises an indicator field indicating that not monitoring the second PDCCH for the first transmission time duration.

4. The terminal according to claim 3, wherein the operations further comprise:
   monitoring the second PDCCH according to received target signaling, when the scheduling DCI is not received from the first PDCCH, wherein the target signaling is different from the scheduling DCI and the target signaling indicates a monitoring parameter associated with the second PDCCH.

5. The terminal according to claim 3, wherein the second PDCCH corresponds to at least one DCI format, or the second PDCCH corresponds to at least one search space.

6. The terminal according to claim 3, wherein the scheduling DCI further comprises an indicator field used for indicating at least one of the following:
   a monitoring parameter associated with the second PDCCH;
   a Connected Discontinuous Reception (CDRX) parameter; or
   monitoring the second PDCCH according to received target signaling, wherein the target signaling is different from the scheduling DCI, and the target signaling is used to indicate a monitoring parameter associated with the second PDCCH.

7. The terminal according to claim 6, wherein the indicator field comprises a dedicated indicator field.

8. The terminal according to claim 6, wherein the indicator field is used to indicate that the monitoring parameter associated with the second PDCCH is one parameter in a monitoring parameter candidate set, wherein the monitoring parameter candidate set is indicated by a network device by using Radio Resource Control (RRC) signaling.

9. The terminal according to claim 6, wherein after determining not to monitor a second PDCCH for the first transmission time duration according to the scheduling DCI, the operations further comprise:
   monitoring the second PDCCH after the first transmission time duration according to the received target signaling.

10. The terminal according to claim 6, wherein before monitoring the first PDCCH, the operations further comprise:
    sending reporting information to a network device, wherein the reporting information is used to indicate not monitoring the second PDCCH for the first transmission time duration, or whether to monitor the second PDCCH within the second transmission time.

11. The terminal according to claim 6, wherein the monitoring parameter associated with the second PDCCH further comprises:
    at least one of a monitoring period, a monitoring offset, or a monitoring duration.

12. The terminal according to claim 3, wherein determining not to monitor the second PDCCH according to the scheduling DCI further comprises:
when the new transmission of data channel or the retransmission of data channel scheduled by the first PDCCH fails,
determining, according to the scheduling DCI, whether to monitor the second PDCCH on a target resource, wherein the target resource is a time domain resource other than a time domain resource of a third PDCCH that schedules the retransmission of data channel, or
monitoring the third PDCCH on the time domain resource of the third PDCCH.

13. A network device, comprising:
a processor; and
a memory having a computer program stored therein and running on the processor, wherein the computer program, when executed by the processor, causes the processor to implement operations comprising:
sending a first Physical Downlink Control Channel (PDCCH) to a terminal, wherein the first PDCCH carries scheduling Downlink Control Information (DCI), wherein the scheduling DCI comprises an indicator field indicating the terminal that not to monitor a second PDCCH for a first transmission time duration, wherein the scheduling DCI is in one of DCI formats: 0_1 or 1_1.

14. The network device according to claim 13, wherein the second PDCCH corresponds to at least one DCI format, or the second PDCCH corresponds to at least one search space.

15. The network device according to claim 13, wherein the scheduling DCI further comprises an indicator field used for indicating at least one of the following:
a monitoring parameter associated with the second PDCCH;
a Connected Discontinuous Reception (CDRX) parameter; or
monitoring the second PDCCH according to received target signaling, wherein the target signaling is different from the scheduling DCI, and the target signaling is used to indicate a monitoring parameter associated with the second PDCCH.

16. The network device according to claim 13, wherein the indicator field comprises a dedicated indicator field.

17. The network device according to claim 15, wherein the network device indicates a monitoring parameter candidate set by using Radio Resource Control (RRC) signaling, wherein the monitoring parameter candidate set comprises at least one monitoring parameter associated with the second PDCCH, and the indicator field is used to indicate one parameter in the monitoring parameter candidate set.

18. The network device according to claim 15, wherein the operations comprise further:
receiving reporting information, wherein the reporting information indicates skipping monitoring the second PDCCH for the first transmission time duration, or whether to monitor the second PDCCH within the second transmission time.

19. The network device according to claim 15, wherein the monitoring parameter associated with the second PDCCH comprises: at least one of a monitoring period, a monitoring offset, or a monitoring duration.

20. The network device according to claim 15, wherein after sending the first PDCCH and when the new transmission of data channel or the retransmission of data channel scheduled by the first PDCCH fails, the operations further comprise:
determining, according to the scheduling DCI, whether to send the second PDCCH on a target resource, wherein the target resource is a time domain resource other than a time domain resource of a third PDCCH that schedules the retransmission of data channel; or
sending the third PDCCH on the time domain resource of the third PDCCH.

* * * * *